May 26, 1936. D. LIBBEE 2,041,770
STREAM DIVIDER
Filed April 14, 1934
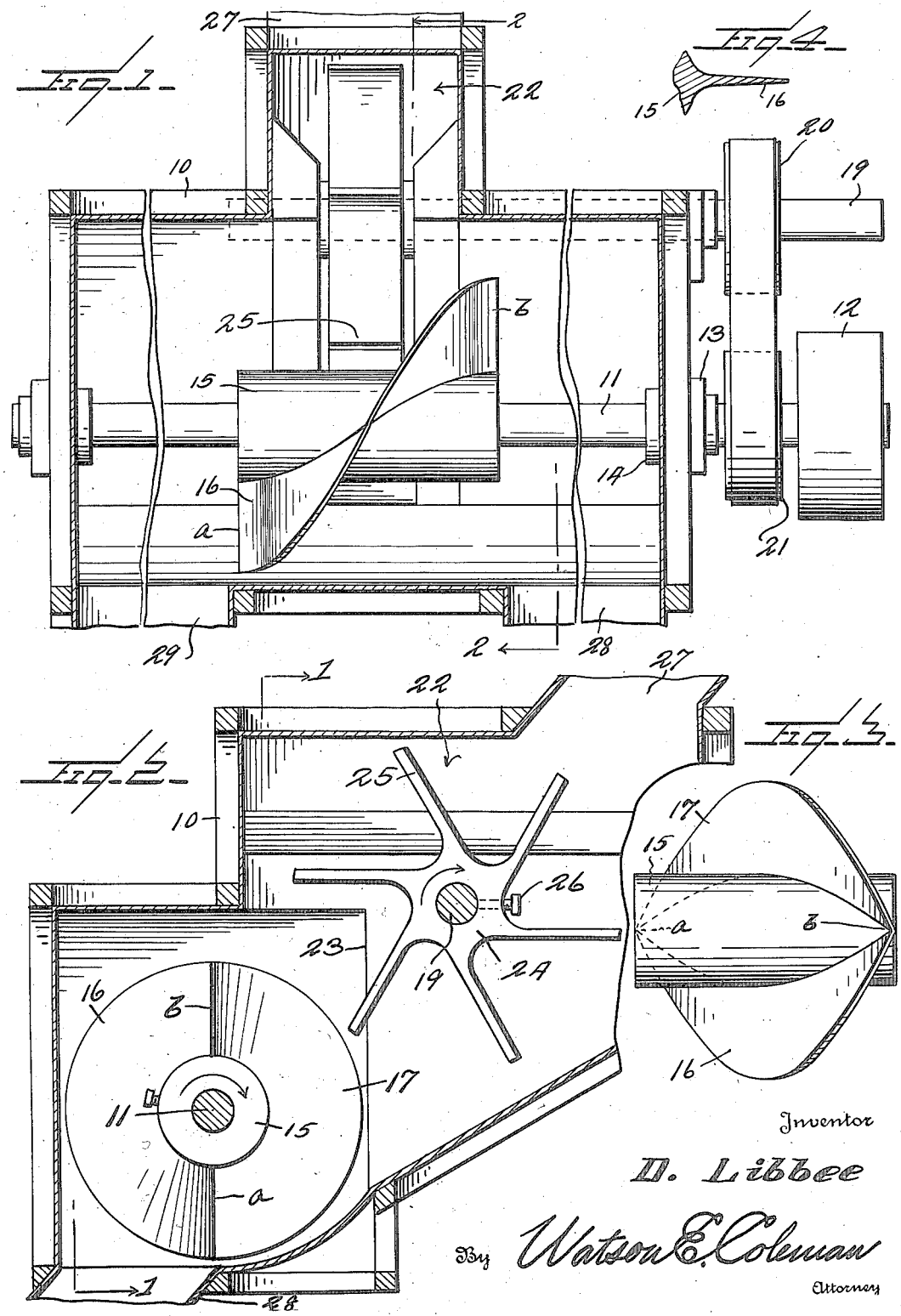
Inventor
D. Libbee
By Watson E. Coleman
Attorney Patented May 26, 1936

2,041,770

UNITED STATES PATENT OFFICE 2,041,770

STREAM DIVIDER

Delbert Libbee, Wilson, Kans.

Application April 14, 1934, Serial No. 720,642

5 Claims. (Cl. 83—44)

This invention relates to devices for dividing streams of material such as corn, rye, other grains or any other free flowing product of like nature so as to direct a stream of material alternately into one spout or into another spout, the general object of the invention being to provide a device of this character which is very simple, which may be cheaply installed and which will accurately divide the material discharged into it into two streams flowing alternately into one discharge spout or another discharge spout and in this connection to provide a feeder which receives the stock from the main spout and directs this material into the divider and prevents any possible tendency to clog.

Other objects will appear in the course of the following description.

My invention is illustrated in the accompanying drawing, wherein:—

Figure 1 is a vertical section on the line 1—1 of Figure 2;

Figure 2 is a section on the line 2—2 of Figure 1;

Figure 3 is a top plan view of the divider itself;

Figure 4 is a fragmentary section through one of the blades and a portion of the drum to show the preferable contour of the blades.

Referring to this drawing, 10 designates any suitable supporting framework or casing while 11 designates a shaft extending through this supporting framework or casing and driven at a constant speed by a pulley 12, the shaft being supported in bearings 13 and held in place in these bearings by collars 14. It will be understood that the shaft 11 might be of such length as to permit the shaft to be shifted longitudinally with relation to its bearing or that the divider now to be described might be adjustably mounted upon the shaft.

The divider as illustrated consists of a drum or cylindrical body 15 carried by the shaft 11. Extending outward radially from one end of the cylindrical drum 15 is a blade 16, which blade extends the full length of the drum 15 and extends spirally around this drum to a point at the other end of the drum, said point being disposed at an angular distance of 180° from the point of origin of the blade at the opposite end of the drum.

Disposed parallel to the blade 16 and extending radially from approximately the same point on the drum is a blade 17 which also extends around the drum spirally through an angular distance of 180° but in a direction the reverse or opposite to the blade 16. This blade ends at approximately the same point as the blade 16. It will thus be seen that both ends of the blades 16 and 17 are radial but that the blades extend in opposite directions spirally around the drum. Thus it will be seen that looking down on the drum and blades, the blades will be brought together or closed at one end and will extend downward around the cylinder and then be brought together and closed at the opposite end as shown in Figure 3.

Extending through the frame 10 above and to one side of the divider is a shaft 19, this shaft carrying upon it a pulley 20 driven by a pulley 21 on the outer end of the shaft 11, the shaft 19 being driven at the same speed as the shaft 11. The divider and its shaft is supported within a casing 10 as previously stated and opening into the middle of this casing and discharging on to the divider is a hopper 22. The opening 23 into the casing or chamber 14 is immediately opposite the middle of the divider and is relatively narrow. The shaft 19 passes through this narrow portion of the hopper and mounted upon this shaft and operating through the opening 23 is a feeder 24 having a series of blades 25 which are tangential to a circle concentric to the axis of the shaft 19. This wing feeder rotates in the same direction as the divider and like the divider is driven at a speed of from 60 to 140 R. P. M. The feeder is shown as being held to the shaft by a set screw 26 but I do not wish to be limited to this.

Discharging into the hopper above the feeder is an inlet spout 27. Thus it will be seen that the material discharged through the inlet spout passes into the hopper and that the feeder positively feeds this material at a definite rate of speed to the divider. The casing 10 within which the divider is placed is provided in its bottom at opposite ends of the divider with discharge spouts 28 and 29 and the divider acts to alternately discharge a stream of material first into the discharge spout 28, then into the discharge spout 29 and then again into the discharge spout 28 and so on so that as the divider operates, one-half of the material passing in through the inlet spout is discharged through the spout 28 and the other half through the discharge spout 29.

It will be understood, of course, that the shaft 11 is continuously driven at a predetermined speed. When it reaches one position, the ends $a$ of the blades 16 and 17 are upward while the ends $b$ of the blades 16 and 17 are downward. Hence all of the material discharged through the inlet spout will be discharged downward and toward the right and into the discharge spout 28. When the divider has rotated through 180°, then ends *a* of the blades 16 and 17 will be downward and ends *b* will be upward and the material discharging on to the divider will be discharged toward the left hand spout 29. The divider constructed as I have made it operates accurately, when adjusted as shown, to divide the material entering from the inlet spout into two equal portions discharging alternately into the spouts 28 and 29. If the divider be adjusted longitudinally, however, relative to the inlet and outlet spouts, a greater proportion of material may be discharged into one spout than into the other. This adjustment of the divider may be secured either by adjusting the shaft 11 or adjusting the drum 15 upon the shaft, and holding it in place by a set screw.

The winged feeder acts to positively prevent any choking of the stock within the housing and hopper as it can receive the stock from an inlet stock and from any direction and will positively feed the stock forward into the divider at a steady speed and to the exact center of the divider. This winged feeder is particularly necessary for successful operation of the divider and with it any swaying of the stock in the spouts or change in the moisture content or temperature of the stock or change in the degree of fineness of the stock cannot act to change the results of the divider as the feeder operating at a constant speed delivers stock to the divider at the same speed and in the same amount at all times.

The discharge spouts may be connected to any machine or place of discharge and no pitch in the spout is lost through installing a stream divider in a line of spouting.

It will be seen that with this device, the divider acts to carry all of the stock the wing feeder will deliver to it in one-half revolution to one discharge spout and in the next half revolution carries all the stock the wing feeder will deliver to it to the other discharge spout. In actual practice, the drum 15 is of cast iron preferably about seven inches long while the wings are from two to two and one-half inches wide and three-sixteenths of an inch thick. The wing feeder is narrower than the drum with its blades.

While for the sake of clearness I have shown in Figures 1 and 3 the blades 16 and 17 as being of equal thickness from the outer edge of the blade to the point of junction with the drum 15, yet preferably the blade will be formed in cross section as shown in Figure 4 where one of the blades is shown and it is illustrated that this blade is rounded out at the base of the blade where it connects to the drum, that is, the base of each blade is preferably one inch thick with a curved taper to three-sixteenths of an inch at the top of the blade. This is for the purpose of avoiding sharp angles at the base of the blades where they connect to the drum and avoid as much as possible the stock being carried around on the drum, the rounding of these angles having the effect of keeping the stock rolling away from the center.

The divider at 120 R. P. M. has some centrifugal force but not enough to interfere with the proper division of the stock. In actual practice I have run one of these feeders at 140 R. P. M. with good results. This speed, however, is probably the maximum speed at which the divider may be operated.

When the middle of the divider is lined up with the exact middle of the wing feeder 24, the distance from one blade to the other blade at this point is the same. By moving the divider on the shaft either to the right or left from this central position, the apex of each blade is brought closer to the center of the feeder, thus shortening the distance between the blades at center of feeder, causing more stock to accumulate at that part of the divider having the greatest distance between the blades, thus securing an uneven distribution of the stock, that is, greater distribution of stock to one discharge spout than to the other.

I claim:—

1. In combination with a single inlet opening and two spaced outlet openings, a stream divider disposed between the inlet and the outlet openings and including a shaft rotating at a constant speed, and blades extending at all points radial to the shaft and starting at the same point on the shaft and extending spirally around the shaft in opposite directions through a turn of 180° and terminating in conjunction at the same point on the shaft, the inlet opening discharging on to said blades, the outlet openings being disposed at the ends of the blades, and the blades as the divider rotates discharging alternately into one or the other of said discharge openings.

2. In combination with a single inlet spout and two discharge spouts laterally spaced from each other and disposed below the inlet spout, a stream divider disposed below the inlet spout and adapted to discharge alternately into the outlet spouts, the stream divider comprising a shaft rotating at a constant speed, a drum mounted on the shaft for rotation therewith but being adjustable longitudinally of the shaft, the drum having two blades extending at all points radially to the shaft, the blades starting at the same point on the drum, extending spirally around the drum in opposite directions through an angle of 180° and terminating in conjunction at the same point on the opposite end of the drum, the inlet spout discharging on to the middle of said drum, the outlet spouts being disposed below opposite ends of the drum, the divider as it is rotated, acting to alternately discharge into one or the other of said discharge spouts.

3. A stream dividing mechanism including a housing having two spaced discharge openings in its bottom, a shaft passing through the housing, a drum on the shaft, two blades extending at all points radially from the drum, said blades being directly opposite each other and being disposed in conjunction with each other at one end of the drum, extending spirally around the drum in opposite directions through 180° to the other end of the drum and terminating in conjunction with each other, a hopper having a discharge opening narrower than the length of the drum, the opening discharging toward the drum, the bottom of the hopper and of said opening extending downward and forward at an inclination and extending beneath a portion of the drum and blades, and means for feeding material in steady quantities downward over said bottom and toward the drum, comprising a shaft extending parallel to but above the shaft upon which the drum and blades are mounted and wings extending outward from the shaft and equi-distantly spaced, and means for rotating the shaft in the same direction and at the same speed as the drum.

4. A stream dividing mechanism including a housing and two spaced discharge openings in its bottom, a shaft passing through the housing, a drum on the shaft, two blades extending at all points radially from the drum, the blades being disposed in conjunction with each other at one end of the drum, extending spirally around the drum in opposite directions through 180° to the other end of the drum and terminating in conjunction with each other, a hopper having a discharge opening narrower than the length of the drum and discharging towards the drum, the bottom of the hopper being downwardly inclined toward the drum and a wing feeder disposed within the hopper and having a shaft and wings extending therefrom, the wings operating through the discharge opening and just above the bottom of the hopper, and means connecting the shaft of the drum with the shaft of the wing feeder, said means rotating the two shafts at the same speed and in the same direction.

5. A stream dividing mechanism including a housing having two spaced discharge openings in its bottom, a shaft passing through the housing, two blades extending at all points radial to the shaft and mounted thereon, said blades being directly opposite each other and being disposed in conjunction with each other at one end, extending spirally around the shaft in opposite directions through an angle of 180° and terminating in conjunction with each other, a hopper having a discharge opening narrower than the length of the blades, the bottom of the hopper discharging downward and forward beneath the blades and means for feeding material in steady quantities downward over the bottom of the hopper and toward the blades including a shaft extending parallel to but above the first named shaft and wings extending outward from the second named shaft and equi-distantly spaced means for driving one of said shafts, and means for rotating both of said shafts at the same speed and in the same direction, the direction being such that the wings of the feeding means move downward towards the upper portion of the hopper and forward toward the wings.

DELBERT LIBBEE.